United States Patent
Miyata et al.

(10) Patent No.: US 9,328,935 B2
(45) Date of Patent: May 3, 2016

(54) HOUSING STRUCTURE

(71) Applicant: ANDEN CO., LTD., Anjo, Aichi-pref. (JP)

(72) Inventors: Susumu Miyata, Anjo (JP); Makoto Tsuruta, Hekinan (JP)

(73) Assignee: ANDEN CO., LTD., Anjo (JP)

( * ) Notice: Subject to any disclaimer, the term of this patent is extended or adjusted under 35 U.S.C. 154(b) by 621 days.

(21) Appl. No.: 13/714,502

(22) Filed: Dec. 14, 2012

(65) Prior Publication Data

US 2013/0189918 A1   Jul. 25, 2013

(30) Foreign Application Priority Data

Jan. 23, 2012   (JP) ................ 2012-011263

(51) Int. Cl.
*F24F 7/00*   (2006.01)
*F21S 8/10*   (2006.01)
*B60Q 1/00*   (2006.01)

(52) U.S. Cl.
CPC . *F24F 7/00* (2013.01); *B60Q 1/007* (2013.01); *F21S 48/332* (2013.01)

(58) Field of Classification Search
CPC ....... F21S 48/33; F21S 48/335; F21S 48/337; F24F 13/222; F24F 13/28; B60H 3/0658; H04R 2499/13; H04R 1/023; G10K 9/22; G10K 11/004; A47B 96/00
USPC ........... 454/254; 381/189, 345, 389; 181/148, 181/150, 153
See application file for complete search history.

(56) References Cited

U.S. PATENT DOCUMENTS

| | | | | |
|---|---|---|---|---|
| 6,128,394 A | * | 10/2000 | Hayakawa et al. | 381/386 |
| 6,410,849 B1 | * | 6/2002 | Okabe et al. | 174/50 |
| 7,913,807 B2 | * | 3/2011 | Gomi | B60R 11/0217 181/149 |
| 7,936,566 B2 | * | 5/2011 | Shigyo | H05K 5/0052 137/14 |
| 2006/0109670 A1 | * | 5/2006 | Kitamura | B60Q 1/0005 362/475 |
| 2012/0328146 A1 | | 12/2012 | Tsuruta et al. | |
| 2013/0187523 A1 | | 7/2013 | Miyata et al. | |
| 2013/0189918 A1 | | 7/2013 | Miyata et al. | |

FOREIGN PATENT DOCUMENTS

| | | | |
|---|---|---|---|
| JP | 2001-332871 A | 11/2001 | |
| JP | A-2002-323351 | 11/2002 | |
| JP | A-2004-229340 | 8/2004 | |
| JP | 2004-319548 A | 11/2004 | |
| JP | 2005158909 | * 6/2005 | ............. B29C 45/14 |

(Continued)

OTHER PUBLICATIONS

U.S. Appl. No. 13/714,529, filed Dec. 14, 2012, Miyata et al.

(Continued)

*Primary Examiner* — Gregory Huson
*Assistant Examiner* — Johntae King
(74) *Attorney, Agent, or Firm* — Posz Law Group, PLC

(57) ABSTRACT

A base portion has a separation wall, and an air hole is defined in the separation wall. A case portion defines a first space with the separation wall of the base portion. A covering portion defines a second space with the separation wall of the base portion. A waterproof and breathable sheet covers the air hole. A water guiding portion is arranged adjacent to a surface of the sheet not to contact the surface of the sheet. The water guiding portion is located between the covering portion and the sheet.

15 Claims, 3 Drawing Sheets

(56) References Cited

FOREIGN PATENT DOCUMENTS

| | | | |
|---|---|---|---|
| JP | A-2006-101287 | 4/2006 | |
| JP | 2011087175 * | 4/2011 | ............... H04R 1/00 |
| JP | 2012-163884 | 8/2012 | |
| JP | 2012-236520 A | 12/2012 | |
| JP | 1461297 | 2/2013 | |
| JP | 2013-150264 A | 8/2013 | |
| JP | 2014-24197 A | 2/2014 | |

OTHER PUBLICATIONS

Office Action mailed Feb. 2, 2015 issued in corresponding JP patent application No. 2012-011263 (and English translation).

Office Action mailed Dec. 17, 2015 issued in corresponding KR patent application No. 10-2013-0002418 (and English translation).

* cited by examiner

HOUSING STRUCTURE

CROSS REFERENCE TO RELATED APPLICATION

This application is based on Japanese Patent Application No. 2012-011263 filed on Jan. 23, 2012, the disclosure of which is incorporated herein by reference in its entirety.

TECHNICAL FIELD

The present disclosure relates to a housing structure.

BACKGROUND

JP-2002-323351A describes a housing which is mounted to outside of a vehicle. The housing defines a first space and a second space inside, and has an air hole which makes the first space and the second space to communicate with each other. The air hole is covered with a sheet made of a waterproof and breathable material. If water enters the air hole, the air hole is closed by the water film caused by the surface tension. At this time, ventilation function of the air hole does not work.

In JP-2002-323351A, a ventilating passage extending to the air hole is made to have a labyrinth (maze) structure, thereby restricting water from entering the air hole.

However, because the size of the maze structure becomes large, the size of the housing also becomes large, and it becomes difficult to mount the housing. Further, it is difficult to discharge the water if the water reaches the air hole through the maze structure.

SUMMARY

It is an object of the present disclosure to provide a housing structure in which a water film is restricted from being generated in an air hole covered with a waterproof sheet.

According to an example of the present disclosure, a housing structure includes a base portion, a case portion, a covering portion, a waterproof sheet and a water guiding portion. The base portion has a separation wall, and an air hole is defined in the separation wall. The case portion defines a first space with the separation wall of the base portion. The covering portion defines a second space with the separation wall of the base portion. The waterproof sheet is made of a material that is waterproof and breathable, and covers the air hole. The water guiding portion is located adjacent to a surface of the waterproof sheet not to contact the surface of the waterproof sheet. The water guiding portion is located between the covering portion and the waterproof sheet.

Accordingly, a water film is restricted from being generated in the air hole covered with the waterproof sheet.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
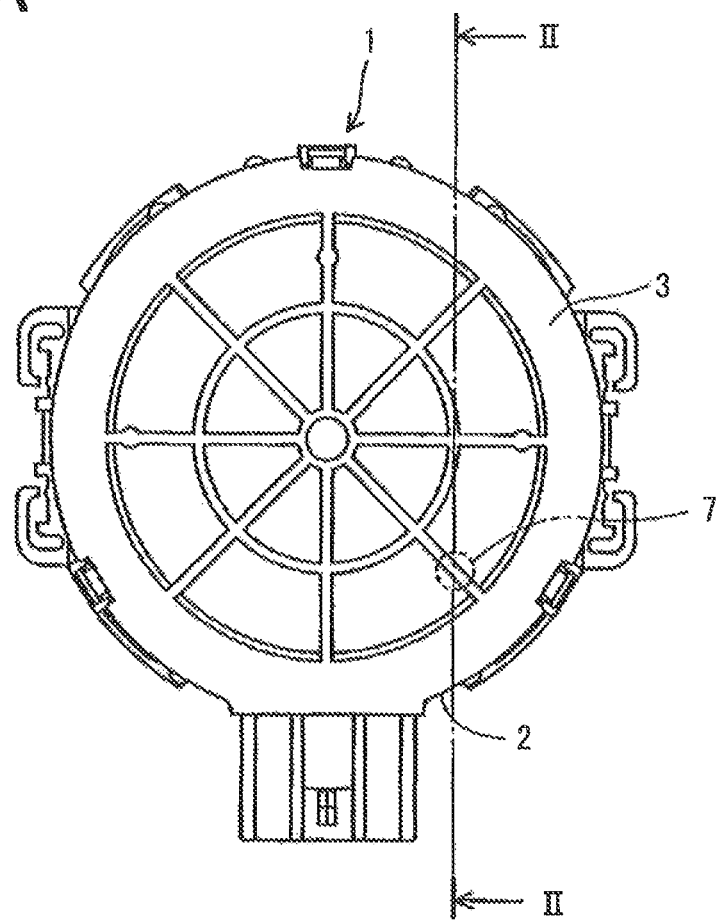
FIG. 1A is a front view illustrating a housing structure according to an embodiment.

An embodiment will be described with reference to FIGS. 1A-5.

A housing 1 includes a base portion 2, a case portion 4 and a covering portion 3, and a sound generating unit 5 is arranged in the housing 1. The base portion 2 is made of resin, and has a separation wall 6 inside. The separation wall 6 is located at an intermediate part in the base portion 2 in an axial direction. The case portion 4 is made of resin, and air-tightly closes a first open end of the base portion 2 in the axial direction. The covering portion 3 is made of resin, and closes a second open end of the base portion 2 in the axial direction to prevent a foreign object such as water drop from entering the housing 1.

The separation wall 6 has an opening 15, and the center of the opening 15 is deviated from the center of the separation wall 6. The sound generating unit 5 is fixed to the separation wall 6 to air-tightly close the opening 15. The sound generating unit 5 may be a speaker or a diaphragm.

Because the case portion 4 is welded or bonded to the first open end of the base portion 2, a space defined and surrounded by the base portion 2, the separation wall 6, the sound generating unit 5 and the case portion 4 is referred as a first space 13 having air-tightness. Further, a second space 14 is defined opposite from the first space 13 through the separation wall 6. If a temperature in the first space 13 is varied, a pressure applied to the sound generating unit 5 is changed to vary (affect) the sound pressure level of the sound generating unit 5. Therefore, the pressure in the first space 13 is adjusted by providing a waterproof sheet 8 to an air hole 7 of the separation wall 6, by welding.

Figure 3:
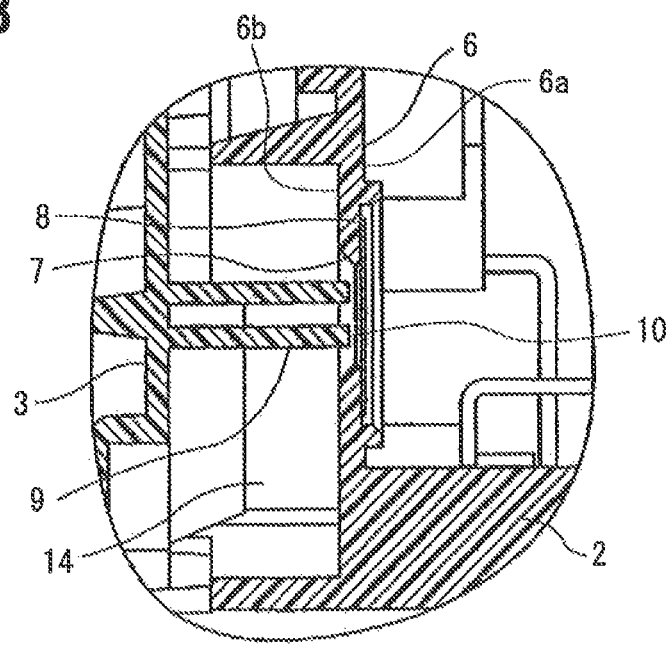
FIG. 3 is an enlarged view of a section III of FIG. 2.
Figure 4:
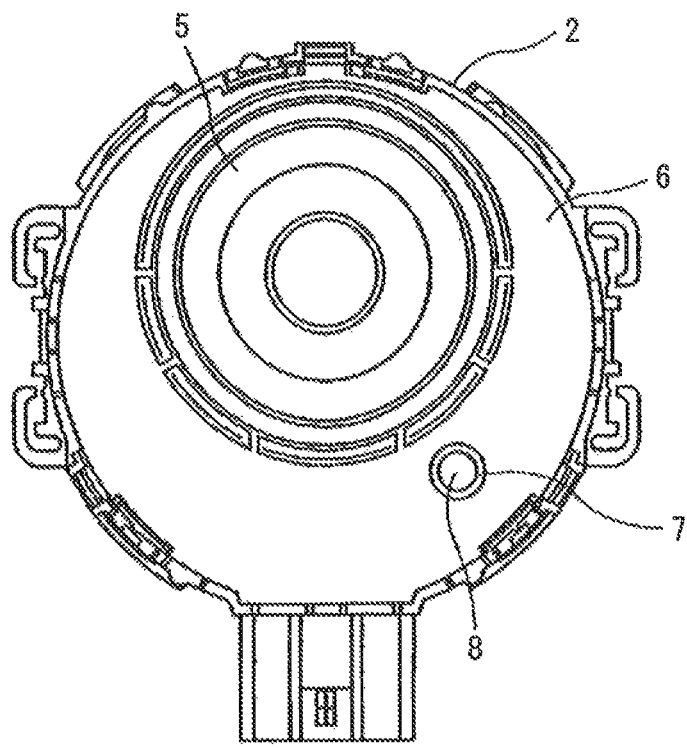
FIG. 4 is a front view illustrating the housing structure without a cover.

As shown in FIGS. 3 and 4, the air hole 7 is defined by perforating the separation wall 6, and has a trumpet shape open toward the second space 14. Specifically, the separation wall 6 has a first surface 6a and a second surface 6b, and a diameter of the air hole 7 in the first surface 6a is smaller than that in the second surface 6b. Inside space of the housing 1 is divided into the first space 13 and the second space 14 by the separation wall 6. The number of the air hole 7 is one in this embodiment, but is not limited to one. The size of the air hole 7 is comparatively small.

The waterproof sheet 8 is made of a filmy material that is waterproof and breathable. For example, Gore-Tex (registered trademark) is adopted as the filmy material.

The covering portion 3 has a through hole (not shown) from which sound generated by the sound generating unit 5 is emitted outside. Further, the covering portion 3 has ribs and slits to restrict rain drop water from permeating through the through hole. A space surrounded by the covering portion 3, the base portion 2 and the separation wall 6 defines the second space 14 which communicates with outside air. When rain drop water enters the second space 14, the water may also enter the air hole 7.

Figure 5:
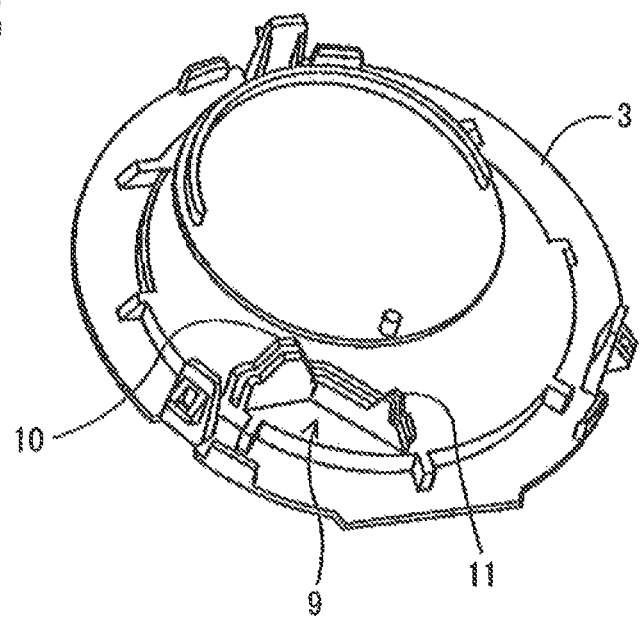
FIG. 5 is a perspective view illustrating the cover.

As shown in FIG. 5, the covering portion 3 has a water guiding portion 9 which is arranged to project from the inner surface of the covering portion 3 defining the second space 14.

The water guiding portion 9 has a pair of plates opposing with each other through a clearance of about 1 mm. As shown in FIG. 5, each plate has an approximately rectangle shape, and the longitudinal side of the rectangle shape contacts the inner surface of the covering portion 3. The opposite side opposite from the longitudinal side has a first projection 10 and a second projection 11. The water guiding portion 9 has the first projection 10 adjacent to an end of the water guiding portion 9 in the longitudinal direction, and the second projection 11 adjacent to the other end of the water guiding portion 9 in the longitudinal direction. Each of the first projection 10 and the second projection 11 is projected from the rectangle shape of each plate.

A height of the first projection 10 from the covering portion 3 is set in a manner that the tip end of the first projection 10 is located adjacent to the waterproof sheet 8, as shown in FIG. 3, when the covering portion 3 is attached to the base portion 2. The positioning of the first projection 10 is determined to be in the adjacent state adjacent to the waterproof sheet 8, but the first projection 10 does not contact the surface of the waterproof sheet 8 opposing to the second space 14. If the clearance between the tip end of the first projection 10 and the surface of the waterproof sheet 8 is zero, the water absorption effect can be enhanced. However, in the present embodiment, the clearance is set as 0.3-0.5 mm not to damage the waterproof sheet 8.

When the covering portion 3 is attached to the base portion 2, the height of the second projection 11 from the covering portion 3 is set in a manner that the second projection 11 contacts the separation wall 6. The height of the second projection 11 is smaller than the height of the first projection 10. Therefore, when the covering portion 3 is attached to the base portion 2, the waterproof sheet 8 is restricted from being damaged by the tip end of the first projection 10.

The water guiding portion 9 has a first part in which the first projection 10 is defined and a second part in which the second projection 11 is defined. The first part of the water guiding portion 9 is extended linearly and shortly toward the outer circumference of the covering portion 3 from the first projection 10. Moreover, as the second part, the water guiding portion 9 is bent immediately after the first projection 10 and extends comparatively long (longer than the first part) toward the outer circumference of the covering portion 3 on the opposite side from the first part.

Figure 1B:
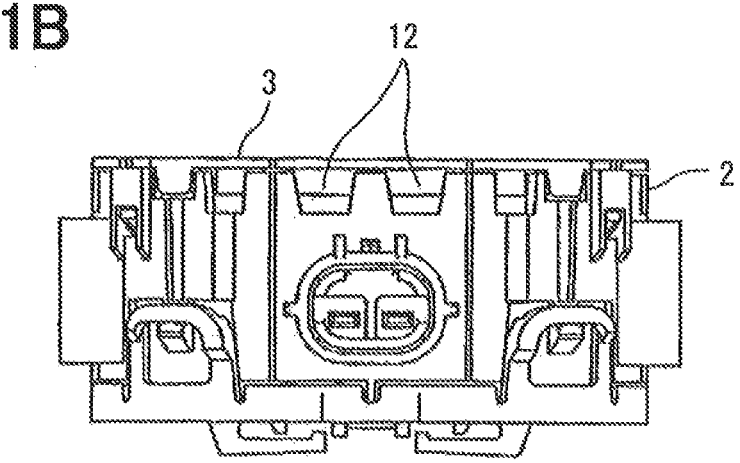
FIG. 1B is a bottom view illustrating the housing structure.
Figure 2:
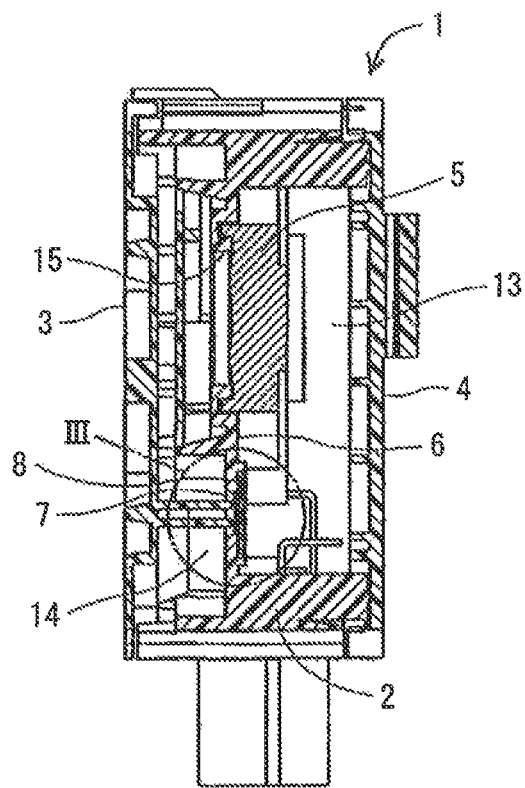
FIG. 2 is a cross-sectional view taken along a line II-II of FIG. 1A.

The both ends of the water guiding portion 9 in the longitudinal direction are arranged on the inner surface of the covering portion 3 to be located near a water discharge port 12 which is shown in FIG. 1B. Therefore, when a water film is generated on the surface of the waterproof sheet 8, which is arranged to the air hole 7, opposing to the second space 14 due to the surface tension, the water film is absorbed by the capillarity of the water guiding portion 9 constructed by the pair of the plates which has the small clearance. Further, the absorbed water is guided by the water guiding portion 9 and is discharged from the water discharge port 12.

The water discharge port 12 is defined in the outer circumference surface of the base portion 2 adjacent to the covering portion 3. Sound generated from the sound generating unit 5 is emitted outside through the water discharge port 12.

As shown in FIG. 3, the tip end of the first projection 10 is located between the first surface 6a of the separation wall 6 and the second surface 6b of the separation wall 6 in the axial direction. As shown in FIG. 5, the second projection 11 is located between the first projection 10 and the water discharge port 12.

According to the embodiment, the water guiding portion 9 is formed in the second space 14 and is located adjacent to the waterproof sheet 8 which covers the air hole 7 of the separation wall 6. Further, the water guiding portion 9 is located immediately adjacent to the waterproof sheet 8 not to contact with the surface of the waterproof sheet 8. Therefore, a water film generated to the waterproof sheet 8 is removed by the water guiding portion 9, so the pressure of the first space 13 is kept suitably. Thus, the sound (tone) quality of the sound generating unit 5 can be made better, and breakage of the sound generating unit 5 can be avoidable.

The present disclosure may be carried out in the modes in which various change, revision, and improvement are added based on knowledge of a person skilled in the art.

The housing 1 accommodates the sound generating unit 5, in the above embodiment. Alternatively, the present disclosure may be applied to a housing for an electromagnetic relay, electronic control unit (ECU), or headlight for a vehicle, which has an air hole for preventing dew condensation and the air hole is required to be covered with a waterproof sheet.

The water guiding portion 9 guides water using the capillarity, in the above embodiment. Alternatively, water may be introduced by adapting Bernoulli's theorem, or by using a pump.

Such changes and modifications are to be understood as being within the scope of the present disclosure as defined by the appended claims.

What is claimed is:

1. A housing structure comprising:
   a base portion having a separation wall in which an air hole is defined;
   a case portion that defines a first space with the base portion;
   a covering portion that defines a second space with the base portion and that has an internal surface that opposes the second space;
   a waterproof sheet made of a material that is waterproof and breathable, the waterproof sheet covering the air hole of the separation wall; and
   a water guiding portion that includes a pair of opposing plates with a clearance therebetween, that is located adjacent to a surface of the waterproof sheet, that is located between the covering portion and the waterproof sheet, that projects from the internal surface that opposes the second space of the covering portion and that projects toward the air hole that passes through the separation wall without contacting the surface of the waterproof sheet.

2. The housing structure according to claim 1, wherein
   the base portion has a water discharge port which is defined in an outer circumference surface of the base portion, and
   the water guiding portion extends to the water discharge port.

3. The housing structure according to claim 1, wherein
   the separation wall has a first surface opposing to the first space and a second surface opposing to the second space,
   the waterproof sheet is disposed on the first surface, and
   the water guiding portion has a first projection and a tip end of the first projection is located between the first surface and the second surface.

4. The housing structure according to claim 3, wherein
   the water guiding portion has a second projection which contacts the separation wall.

5. The housing structure according to claim 4, wherein
   the base portion has a water discharge port which is defined in an outer circumference surface of the base portion,
   the water guiding portion extends to the water discharge port, and
   the second projection is located between the first projection and the water discharge port.

6. The housing structure according to claim 1, wherein
   the separation wall partitions the first space and the second space from each other, and the separation wall has an opening to receive a sound generating unit.

7. The housing structure according to claim 1, wherein
   the water guiding portion has a center axis in agreement with a center axis of the air hole.

8. The housing structure according to claim 1, wherein
the first space and the second space communicate with each other only through the air hole of the separation wall, and
the second space communicates with outside air.

9. The housing structure according to claim 1, wherein
the water guiding portion is arranged in the second space and is located immediately adjacent to the waterproof sheet that is made of a filmy material, and
the water guiding portion guides water such that a water film generated in the air hole covered with the waterproof sheet is removed by a capillarity of the water guiding portion.

10. The housing structure according to claim 1, wherein the first space is larger than the second space.

11. The housing structure according to claim 1, wherein the first space extends along the base portion.

12. The housing structure according to claim 1, wherein the waterproof sheet is a filmy material.

13. The housing structure according to claim 1, wherein the water guiding member further comprises
a first rectangular portion that extends along the covering portion and includes a first projection, and
a second rectangular portion that extends along the covering portion, and includes a second projection, the second rectangular portion adjacently aligned to the first rectangular portion so that a gap exists between the second rectangular portion and the first rectangular portion, wherein
the gap is configured to be a size that allows water collected on the waterproof sheet to move through the gap by capillary action.

14. A waterproof housing structure comprising:
a base portion that includes a first side and a second side, and a separation wall that separates the first side and the second side, and an air hole that penetrates the separation wall from the first side to the second side and that is covered by a waterproof, flexible fabric-sheet;
a covering portion configured to mate with the first side of the base portion, the covering portion defining a second space between the covering portion and the base portion, having an internal surface that opposes the second space, and including a water guiding portion that includes a pair of opposing plates with a clearance therebetween, that projects from the internal surface that opposes the second space of the covering portion, and that extends toward the air hole of the base portion without contacting the waterproof, flexible fabric-sheet, the water guiding portion configured to collect water from the waterproof, flexible fabric-sheet; and
a case portion configured to mate with the second side of the base portion, and defining a first space between the case portion and the base portion.

15. The housing structure according to claim 14, wherein the water guiding member further comprises
a first rectangular portion that extends along the covering portion and includes a first projection, and
a second rectangular portion that extends along the covering portion, and includes a second projection, the second rectangular portion adjacently aligned to the first rectangular portion so that a gap exists between the second rectangular portion and the first rectangular portion, wherein
the gap is configured to be a size that allows water collected on the waterproof sheet to move through the gap by capillary action.

* * * * *